(12) United States Patent
Baer et al.

(10) Patent No.: US 6,366,916 B1
(45) Date of Patent: Apr. 2, 2002

(54) CONFIGURABLE AND EXTENSIBLE SYSTEM FOR DEPLOYING ASSET MANAGEMENT FUNCTIONS TO CLIENT APPLICATIONS

(75) Inventors: William J. Baer; I-Ming Kao; Pedro Jacob, Jr., all of San Jose; Janet L. Murray, LosGatos, all of CA (US); Deidra S. Picciano, New Fairfiled, CT (US); Jerry D. Robertson, San Jose; James A. Willey, Cupertino, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,933

(22) Filed: Dec. 23, 1998

Related U.S. Application Data

(60) Provisional application No. 60/086,382, filed on May 22, 1998.

(51) Int. Cl.$^7$ .............................................. G06F 17/30
(52) U.S. Cl. .......................... 707/10; 707/10; 707/103; 707/1
(58) Field of Search ................... 707/10, 103

(56) References Cited

U.S. PATENT DOCUMENTS

| | | | |
|---|---|---|---|
| 5,175,825 A | 12/1992 | Starr | 395/325 |
| 5,187,787 A | 2/1993 | Skeen et al. | 395/600 |
| 5,265,250 A * | 11/1993 | Andrade et al. | 395/650 |
| 5,341,478 A * | 8/1994 | Travis, Jr. et al. | 395/200 |
| 5,414,644 A | 5/1995 | Seaman et al. | 364/551.01 |
| 5,423,042 A | 6/1995 | Jalili et al. | 395/700 |
| 5,440,744 A * | 8/1995 | Jacobson et al. | 395/650 |
| 5,455,958 A | 10/1995 | Flurry et al. | 395/800 |
| 5,504,892 A * | 4/1996 | Atsatt et al. | 395/600 |
| 5,522,041 A | 5/1996 | Murakami et al. | 395/200.01 |
| 5,528,281 A | 6/1996 | Grady et al. | 348/7 |
| 5,557,798 A | 9/1996 | Skeen et al. | 395/650 |
| 5,611,076 A | 3/1997 | Durflinger et al. | 395/613 |
| 5,625,404 A | 4/1997 | Grady et al. | 348/7 |
| 5,631,693 A | 5/1997 | Wunderlich et al. | 348/7 |
| 5,661,516 A | 8/1997 | Carles | 348/8 |
| 5,682,534 A | 10/1997 | Kapoor et al. | 395/684 |
| 5,687,373 A | 11/1997 | Holmes et al. | 395/682 |
| 5,689,703 A | 11/1997 | Atkinson et al. | 395/614 |
| 5,699,518 A | 12/1997 | Held et al. | 395/200.11 |
| 5,712,906 A | 1/1998 | Grady et al. | 379/93.17 |
| 5,717,747 A | 2/1998 | Boyle, III et al. | 379/201 |
| 5,724,575 A | 3/1998 | Hoover et al. | 395/610 |
| 5,729,739 A | 3/1998 | Cantin et al. | 395/614 |
| 5,745,754 A | 4/1998 | Lagrade et al. | 395/615 |
| 5,752,244 A | 5/1998 | Rose et al. | 707/5 |
| 5,752,246 A | 5/1998 | Rogers et al. | 707/10 |
| 6,125,364 A * | 9/2000 | Greef et al. | 707/103 |
| 6,195,662 B1 * | 2/2001 | Ellis et al. | 707/103 |

OTHER PUBLICATIONS

IBM Technical Disclosure Bulletin, "Copying Large Data Objects with Directory Attributes" vol. 36 No. 05, pp. 65–67, May 1993.

* cited by examiner

*Primary Examiner*—Paul R. Lintz
(74) *Attorney, Agent, or Firm*—Sughrue, Mion, Zinn, Macpeak & Seas, PLLC

(57) ABSTRACT

A flexibly adaptable, i e., configurable and/or extensible, asset management system is disclosed for processing and querying assets, representing data. The system comprises three layers: a Client Application layer, for manipulating and browsing assets, an Asset Manager Server layer, for providing programming interface services specific for assets types, such as storing, querying, and retrieving assets representing data to and from a Data Store, representing the third layer. The Asset Manager Server layer further provides communication services to support the Client Application layer and file transfer between the Client Application layer and the Asset Manager Server layer. The Asset Manager Server includes several configurable and/or extensible modules, including a Client Adapter module, a Schema Adapter module and a Resources module.

46 Claims, 8 Drawing Sheets

CONFIGURABLE AND EXTENSIBLE SYSTEM FOR DEPLOYING ASSET MANAGEMENT FUNCTIONS TO CLIENT APPLICATIONS

CROSS REFERENCE TO PROVISIONAL APPLICATION

This application claims priority from U.S. Provisional Application No. 60/086,382, entitled "Digital Library With Architecture Guide," filed on May 22, 1998, by William J. Baer, Pedro Jacob Jr., I-Ming Kao, Jan L. Murray, Deidra S. Picciano, Jerry D. Robertson III, and James A. Willey, attorney's reference number ST9-98-062, which is incorporated by reference herein.

CROSS REFERENCE TO RELATED APPLICATIONS

This application is also related to the following applications, filed on the same day as the present application:

Ser. No. 09/219,934, entitled "Method And Apparatus For Using Classes, Encapsulating Data With Its Behaviors, For Transferring Between Databases And Client Applications And For Enabling Applications To Adapt To Specific Constraints Of The Data" to William J. Baer, I-Ming Kao, Pedro Jacob, Janet L. Murray, Deidra S. Picciano and Jerry D. Robertson;

Ser. No. 09/220,291, entitled "Method And Apparatus For Dynamically Customizing And Extending Functions Of A Server Program To Enable And Restrict Functions Of The Server" to William J. Baer, I-Ming Kao, Pedro Jacob, Janet L. Murray, Deidra S. Picciano and Jerry D. Robertson; and Ser. No. 09/220,293, entitled "Method And Apparatus For Configurable Mapping Between Data Stores And Data Structures And A Generalized Client Data Model Using Heterogeneous, Specialized Storage" to William J. Baer, I-Ming Kao, Pedro Jacob, Janet L. Murray, Deidra S. Picciano and Jerry D. Robertson.

BACKGROUND OF THE INVENTION

1. Field of the Invention

The present invention relates in general to asset management, and in particular to a flexibly adaptable, i.e. configurable and/or extensible, system for deploying asset management functions to client applications. The present invention further relates to other features of an asset management system, including encapsulating data with its behaviors for transferring information between databases and client applications and enabling client applications to adapt to specific constraints of the data, dynamically customizing and extending functions of a server program to enable and restrict functions of the server, and configurably mapping between data stores and data structures, thereby providing a generalized client data model.

2. Description of the Related Art

Assets, which represent data, must be properly managed for their value to be maximized. These assets may represent data in the form of text, full-motion video, audio, graphics, or images, for example. Regardless of the asset form, asset solutions are needed having sufficient storage capacity, scalability and sophisticated searching techniques.

Assets can be stored in physical storage devices, for example, in various searchable databases. Most existing database applications provide searching and manipulation capabilities for only a specific asset or data type for a specific database. However, such existing applications lack the flexibility to be imported to different databases or to handle different asset or data types. At the same time, creation of the assets can be accomplished for a specific client problem in existing applications, but cannot be expanded to cover a generic situation.

For example, U.S. Pat. No. 5,745,754 to Lagarde et al., an example of an existing system, teaches a system for querying databases located on multiple platforms, processing data obtained, and presenting processed data to a client. The system includes an application-processing agent (web server), which performs tasks in a distributed environment based on received requests from the client. However, Lagarde et al. does not provide the flexibility of the present invention.

As the development of modern digital media continues, the volume of assets is growing rapidly. This rapid increase in assets requires the development of efficient asset management technology through integration of the technologies of information capture, storage management and search and retrieval.

SUMMARY OF THE INVENTION

To overcome the limitations in the prior art described above, and to solve various problems that will become apparent upon reading and understanding of the present invention, the present invention provides a method, apparatus, and article of manufacture for computer-implemented management of assets in an object oriented environment.

In accordance with the present invention, a flexibly adaptable, i.e., configurable and/or extensible, asset management system is disclosed for processing and manipulating assets, representing data. The system comprises three layers: a Client Application layer, for manipulating and browsing assets, an Asset Manager Server layer, for providing programming interface services specific to assets types, such as storing, querying, and retrieving assets representing data. The data is stored in a Data Store, representing the third layer of the system. The Asset Manager Server layer also provides communication services to support the Client Application layer and file transfer between the Client Application layer and the Asset Manager Server layer.

The Asset Manager Server layer includes several configurable modules, including a Client Adapter module, a Schema Adapter module and a Resources module.

An object of the present invention is to provide a framework that generalizes many existing techniques and provides a configurable and/or extensible asset management system, which is reusable for different client applications and data types.

Another object of the invention is to provide a system having a configurable Asset Manager Server.

A further object of the invention is to provide a system using classes, encapsulating data with its behaviors, for transferring data between databases and client applications.

Yet a further object of the invention is to provide a system capable of dynamically customizing and extending functions of an Asset Manager Server program.

Yet another object of the invention is to provide a system capable of configurably mapping between Data Stores and data structures.

BRIEF DESCRIPTION OF THE DRAWINGS

The above objects and advantages of the present invention will become more apparent by describing in detail preferred

DETAILED DESCRIPTION OF THE PREFERRED EMBODIMENT

In the following description of the preferred embodiment, reference is made to the accompanying drawings which form a part hereof, and which show by way of illustration a specific embodiment of the invention. It is to be understood by those of ordinary skill in this technological field that other embodiments may be utilized, as structural changes may be made without departing from the scope of the present invention. For example, while the following discussion is presented in the context of a Java® (a registered trademark of Sun Microsystems Inc.) based implementation, the present invention is not so limited.

I. Overall Architecture

Figure 1:
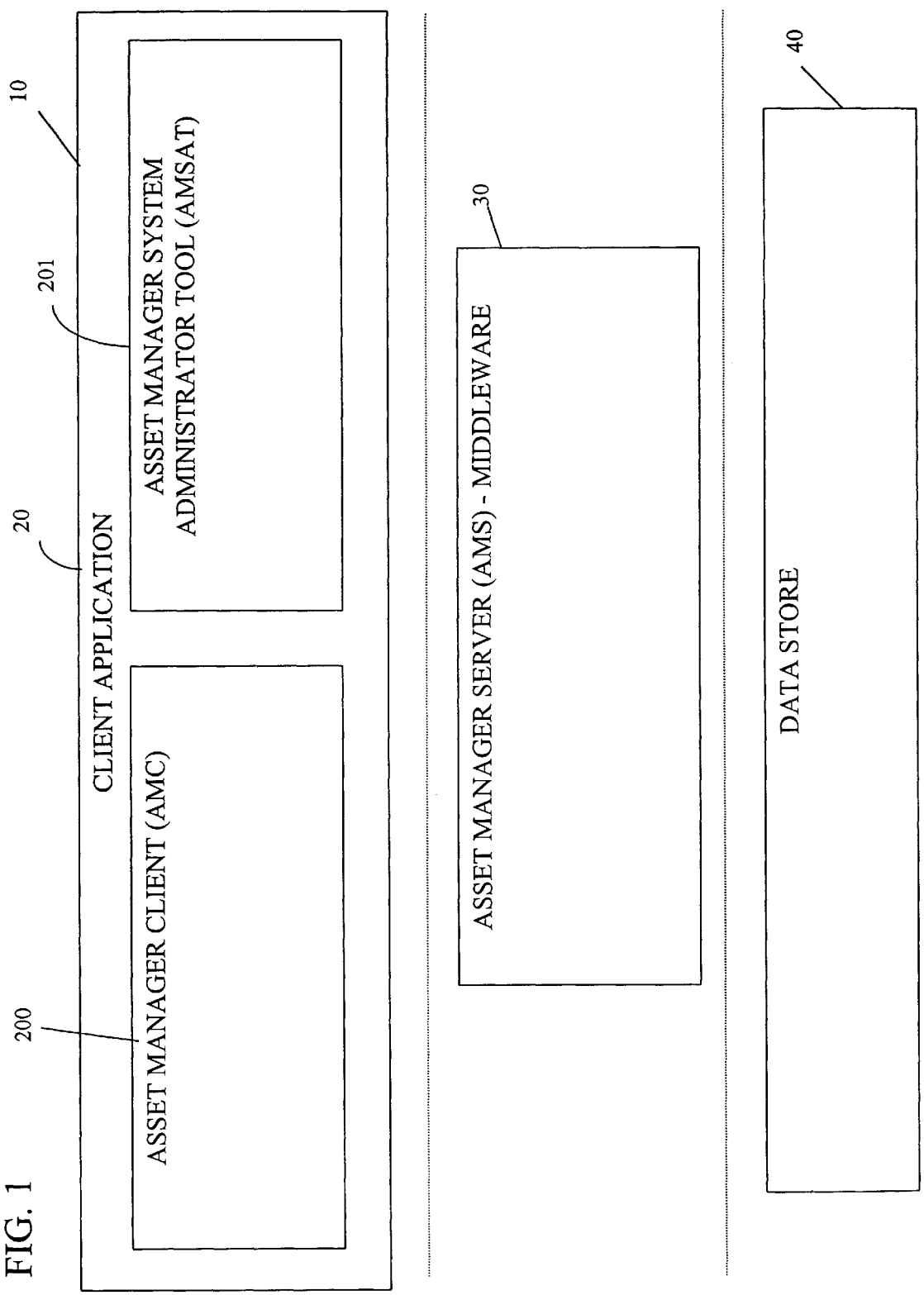
FIG. 1 illustrates a block diagram of an asset management system for use in accordance with the present invention.

FIG. 1 illustrates one embodiment of the overall architecture of a flexibly adaptable, i.e., configurable and/or extensible, system 10 in accordance with the present invention. The system 10 includes a three-tiered architecture having a Client Application layer 20, an Asset Manager Server (AMS) 30 serving as a middleware layer, and a Data Store layer 40.

The Client Application layer 20 allows a user to interact with AMS 30. With this configuration, a user need not know of the details or even the existence of the Data Store layer 40. The Client Application layer 20 consists of an Asset Manager Client (AMC) 200, allowing the user to manipulate and browse assets, and an Asset Manager System administrator tool (AMSAT) 201 for maintaining and configuring the AMS 30.

An asset is defined to be a set of related data, or meta data, for a document or an object and/or the actual data itself. It is the assets which provide the Client Application with an easy to use interface for manipulating data without the Client Application needing to know where or how the data is actually stored. The set of related data may consist of relational data, files, references to files from indexing engines, or any other combination of data types. Each asset has an associated asset type used by the system 10 to identify a particular mapping between the assets and the actual data stored. In other words, different asset types will have different mappings. Specific details of the components of the system 10 and their respective functions will be discussed below.

Figure 2:
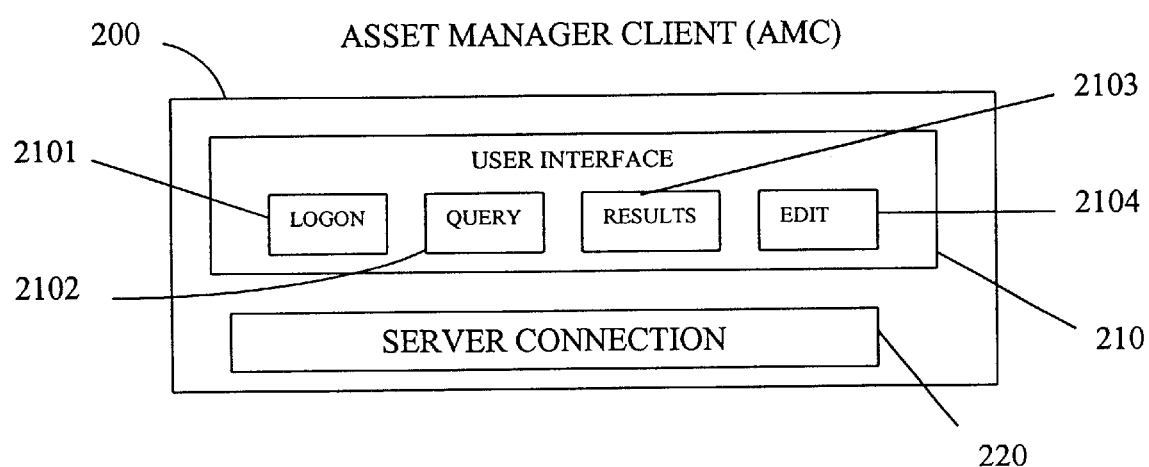
FIG. 2 illustrates a block diagram of an Asset Manager Client for use in accordance with the present invention.

Turning to FIG. 2, the AMC 200 provides the user with a user interface 210, an application programming interface (API), with which the user interacts. In one example, the user interface may include four modules: a logon module 2101, incorporating functions needed to logon to/logoff from the AMS 30; a query module 2102 housing functions needed to query the AMS for assets; a results module 2103 providing functions needed to browse results returned by a query applied to the AMS 30; and an edit module 2104 incorporating functions needed to manipulate (add, update, delete, and retrieve, for example) assets. The AMC 200 also includes a server connection 220, which provides the connection between the AMS 30 and the user interface 210 of AMC 200.

Figure 3:
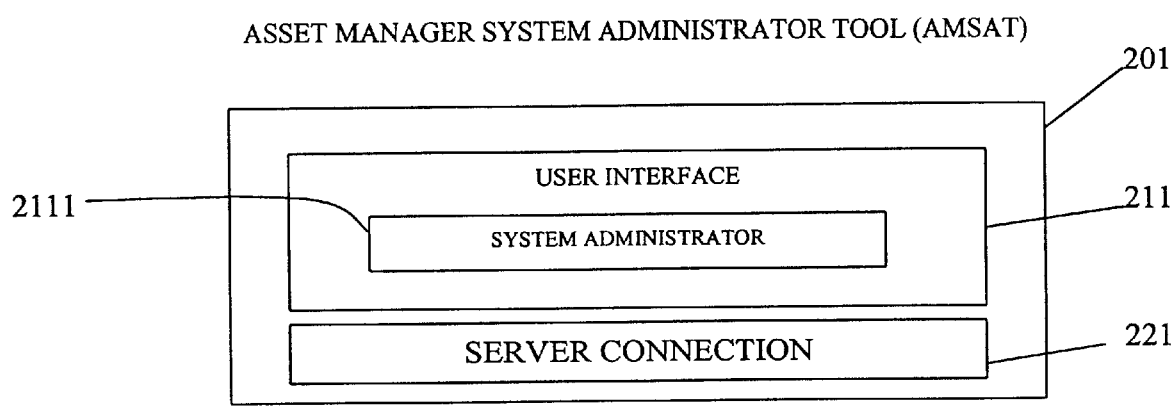
FIG. 3 illustrates a block diagram of an Asset Manager System Administration Tool for use in accordance with the present invention.

Referring now to FIG. 3, the AMSAT 201 of Client Application 20 is designed to allow a particular user, a system administrator, to manipulate the configuration of the AMS 30. Modules within AMS 30 which can be configured, including Schema Adapters, Client Adapters, Plug-ins and external services, will be discussed in further detail below. The AMSAT 201 provides the system administrator with a user interface 211 and allows the system administrator to configure the AMS 30 through system administration module 2111. The AMSAT further includes a server connection 221, similar to server connection 220 in the AMC, providing a connection between the AMS 30 and the user interface 211 of AMSAT 201.

Figure 4:
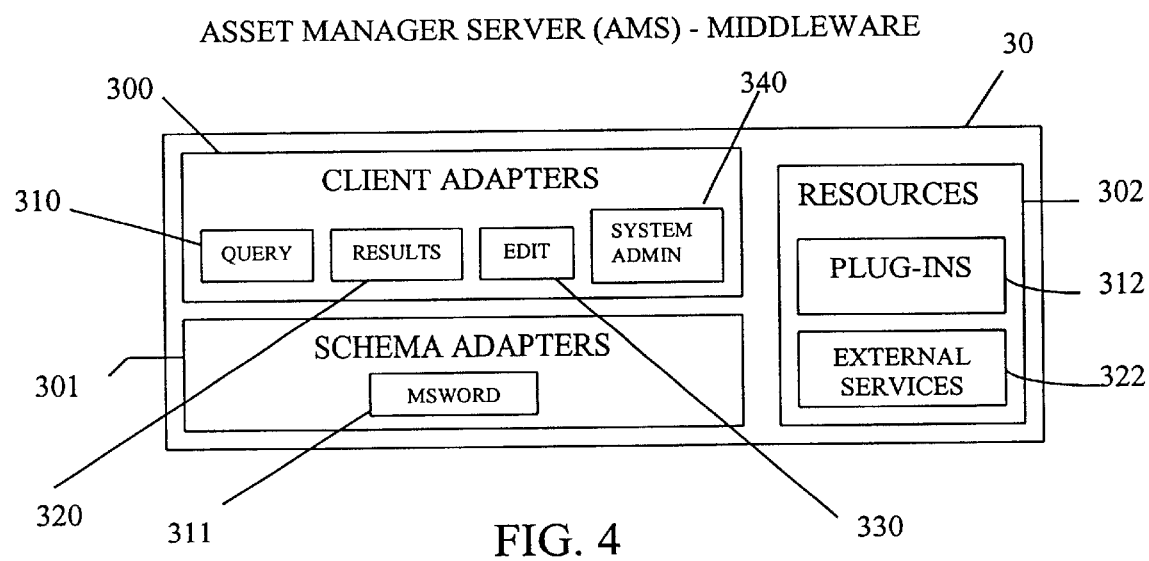
FIG. 4 illustrates a block diagram of an Asset Manager Server for use in accordance with the present invention.

FIG. 4 illustrates the AMS 30 middleware layer of the system 10. The AMS 30 provides, for specified asset types, programming interface services, such as storing, querying, and retrieving assets representing data to and from the Data Store 40. The AMS 30 also provides communication services to support the Client Application 20 and file transfer between the Client Application 20 and the AMS 30. As shown in FIG. 4, the AMS 30 includes a Client Adapter module 300, a Schema Adapter module 301, and a Resources module 302. It is to be noted that in the present system, there may be one or more Client Applications 20 in communication with one or more Client Adapter modules 300 and one or more Client Adapter modules 300 in communication with one or more Schema Adapter modules 301. These components of AMS 30 will each be described in further detail below.

Figure 5:
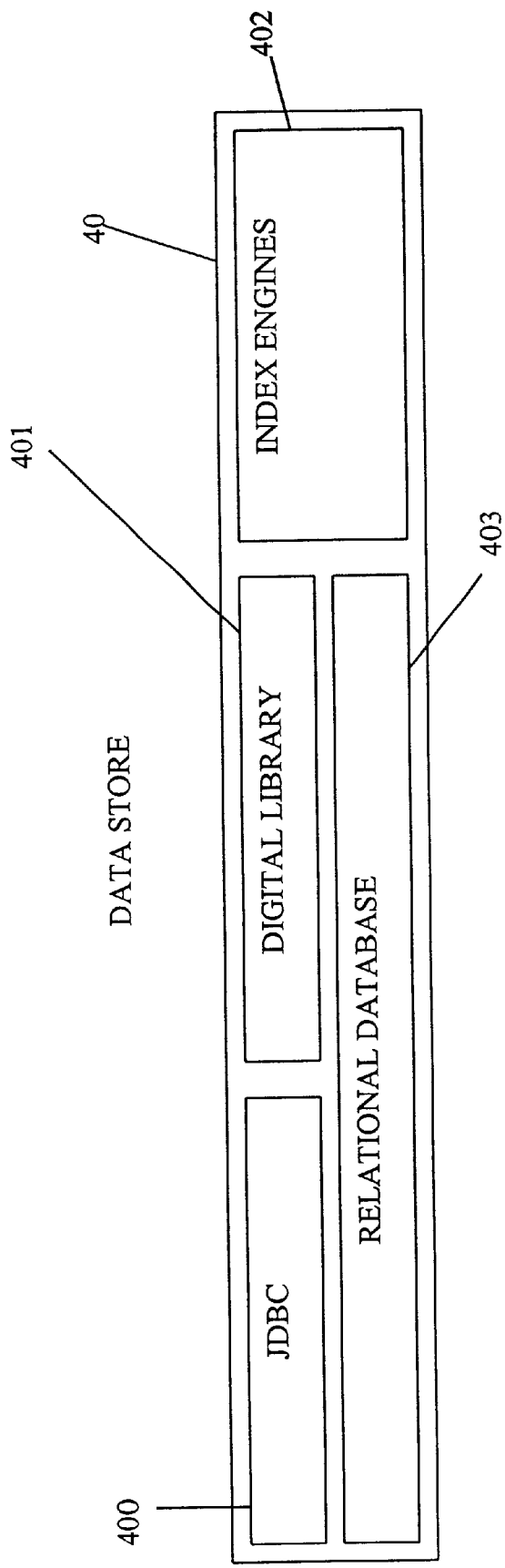
FIG. 5 illustrates a block diagram of a Data Store for use in accordance with the present invention.

FIG. 5 shows the third layer of the system 10, the Data Store layer 40. The Data Store 40 may consist of database systems, indexing engines, and data connection systems needed to store data. In one example, the Data Store 40 may include a digital library 401 for storing, querying, and retrieving data files and a relational database 403 for storing information about the data files. The relational database 403 may be DB2®, an application of International Business Machines Corporation (IBM). The digital library 401 can communicate with the AMS 30 through an interface to perform add, update, and delete operations, for example. The Data Store 40 may also include a Java® Database Connectivity module (JDBC) 400 to establish communication between the AMS 30 and the relational database 403 which may also be used by the relational database 403 to perform parametric query operations via the JDBC 400. The Data Store 40 may further include indexing engines 402 for processing queries using free text searches. The digital library 401, the relational database 403, and the indexing engines 402 can each have an external services adapter within the Resources module 302 of AMS 30 in FIG. 4.

Figure 6:
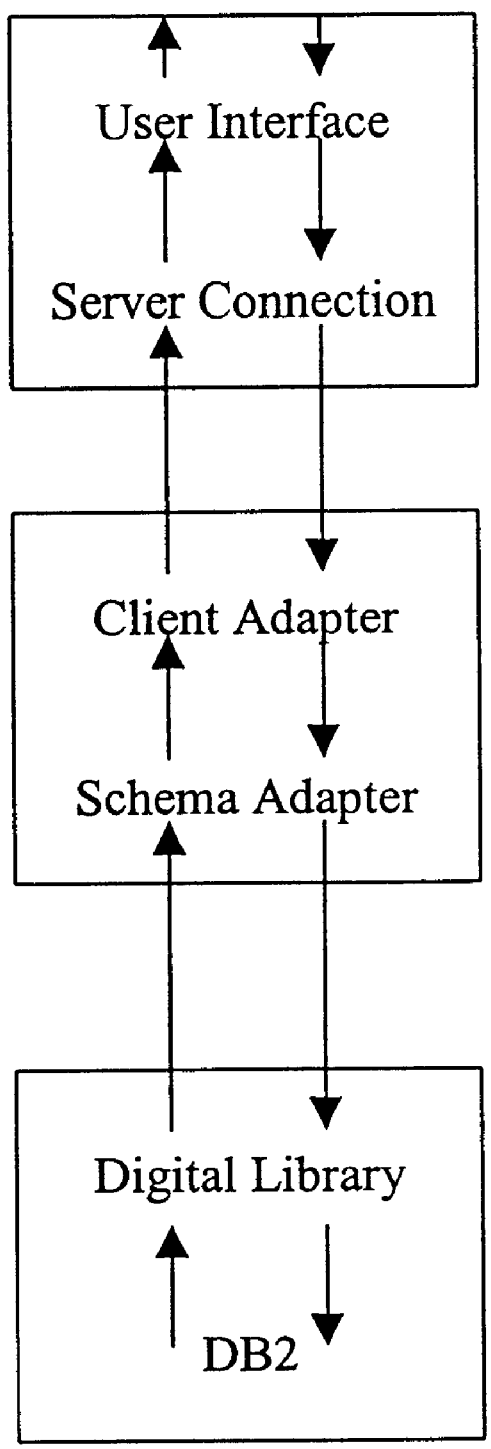
FIG. 6 illustrates the flow of control passing between the Asset Manager Client, the Asset Manager Server, and the Data Store of the present invention.

Referring now to FIG. 6, each of the three layers presented above communicate with each other as shown. For example, when a user issues a query from the Client Application 20, flow of control passes from the AMC 200 through the AMS 30 to the Data Store 40 and back.

II. The Asset Manager Server

Referring back to FIG. 4, the AMS 30 includes the Client Adapter module 300, the Schema Adapter module 301, and the Resources module 302. The details of each of these modules will now be discussed.

A. The Client Adapter Module

The Client Adapter module 300 provides much of the functionality needed to interact with the Client Application 20. More specifically, the Client Adapter module 300 provides the interfaces used by the Client Application 20 to interact with the AMS 30. The Client Adapter module 300 further acts as a bridge between the Schema Adapter module 301 and the Client Application 20. Finally, the Client Adapter module 300 also utilizes the Resources module 302 to accomplish tasks required by the Client Application 20.

Referring to FIG. 4, the Client Adapter module 300 includes one or more Client Adapters. The Client Adapters may constitute Java® classes that encapsulate data and a related set of functionality and also function as an API to the AMS 30. As a result, the Client Application 20 contacts the Client Adapters when prompted by the user to communicate with the AMS 30. In one example, the Client Adapter module 300 may contain four Client Adapters: query 310, results 320, edit 330, and system administrator 340. However, according to the present invention, any number of Client Adapters can be added to or deleted from the Client Adapter module 300, thereby providing for the configurability of the AMS 30.

In the example illustrated in FIG. 4, the system administrator 340 Client Adapter performs system administration tasks and provides a communication link between the AMS 30 and the AMSAT 201. The other Client Adapters, query 310, results 320, and edit 330, interact with the AMC 200 and with the Schema Adapter module 301.

Figure 7:
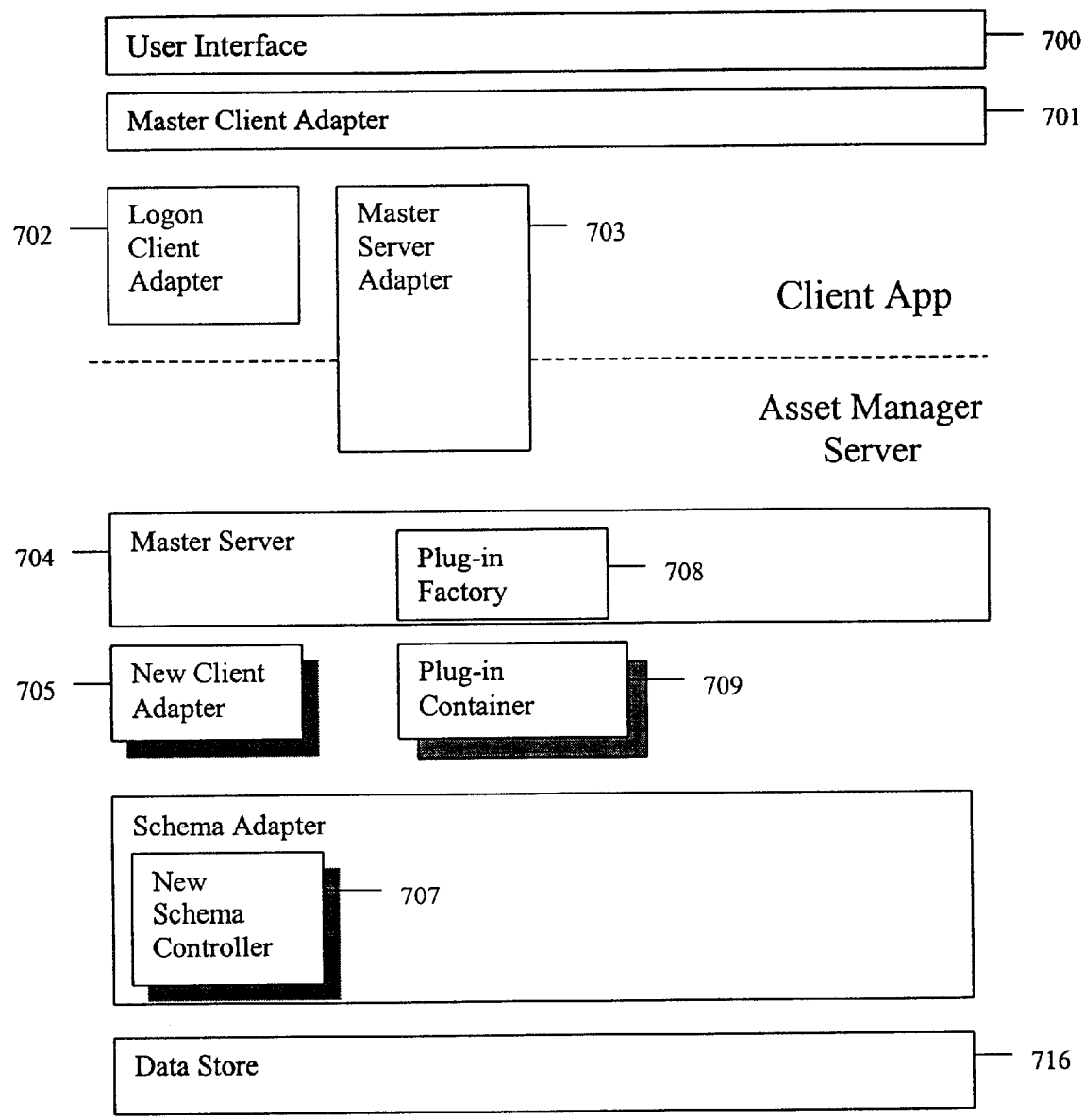
FIG. 7 illustrates an example showing details of the asset management system shown in FIG. 1.

FIG. 7 is a modified version of a combination of FIGS. 1, 2, 4 and 5, showing additional details which will be used in the discussion of four examples presented below. These four examples illustrate the configurability of the present system. The present system can understand many different file types, extract data from the files and populate a data model definable by the user. This structure provides for adaptive data storage, dynamic data modeling and dynamic interfaces.

In FIG. 7, the components above the dashed line can be found in the Client Application (20 in FIG. 1). User interface 700 corresponds to user interface 210 of FIG. 2. Master Client Adapter 701 and logon Client Adapter 702 correspond generally to functions provided by server connection 220 of FIG. 2. Master server adapter 703 corresponds generally to functions provided by server connection 220 of FIG. 2 and by AMS 30 of FIG. 4. Master server 704 provides connectivity functions between AMS 30 of FIG. 4 and server connection 220 of FIG. 2. New Client Adapter 705 corresponds to a Client Adapter in Client Adapter module 300 in FIG. 4 and new schema controller 707 corresponds to a specific Schema Adapter in Schema Adapter module 301 of FIG. 4. Data Store 716 corresponds to Data Store 40 of FIG. 5. Plug-in factory 708 and Plug-in container 709 correspond to the Plug-ins module 312 in FIG. 4.

Additionally, in the following examples, terminology which will be used is defined as follows. A method is defined as a function executed in the system 10. An interface consists of a group of functions or methods. An argument is a parameter of a function. A subclass is used to extend an abstract class or interface to modify the interface of the abstract class in some way. An API is a specific type of interface consisting of a group of functions.

Furthermore, in each of the four examples presented below, it is assumed that a new file or data type, Microsoft® Word™, is to be supported. As noted earlier, the present invention is applicable to a variety of asset or data types, not to be limited by the following example. Finally, in the four examples presented herein, the code sections are written in Java®. However, other code implementations of the present invention are possible.

B. Example: Creating and Adding New Client Adapters

In accordance with the present invention, the system 10 is configurable and/or extensible. The configurability and/or extensibility is provided, in part, by the ability to construct and add new ones of the Client Adapters to the Client Adapter module 300. The configurable and/or extensible system of the present invention provides the benefit of dynamic APIs between the Client Application 10 and the AMS 20. Additionally, the system of the present invention allows new ones of Client Application 10 to be connected to the AMS 20 by implementing new Client Adapters. As Client Adapters are added, the AMS 20 provides new functionality to the Client Application 10. Correspondingly, as Client Adapters are removed, the AMS 20 provides reduced functionality to the Client Application 10.

New Client Adapters may created and added in accordance with the following steps:

i. Define User Interactions with the AMS;

ii. Define an API encapsulating new functionality;

iii. Define the Client Adapter Load Time Interface;

iv. Define the Client Adapter Run Time Interface.

Each of these steps will now be discussed in detail.

i Define the User Interactions with the AMS

Prior to defining the API for a new Client Adapter, the way in which a user will be interacting with the AMS, i.e., how the Client Adapter will be used, should be defined. Generally, a user interface is already available for manipulating (add, update, delete and retrieving) as well as querying Word™ documents. Thus, in the present example, the user may want additional interfaces to add, update, delete, retrieve and query Word™ documents based on a number of properties defined in Word™ format. For example, the user may wish that each paragraph from a document be extracted and placed into IBM's Text Miner™ product. This will allow the user to perform free text queries on the paragraphs. In addition, the user may wish to have available information regarding the number of paragraphs and pages in each Word™ file. The text of the paragraphs, number of paragraphs and the number of pages are referred to as properties of the Word™ file.

ii. Define an API Encapsulating the New Functionality

Taking the retrieve interface as an example of new functionality which is desired by a user, an API needs to be defined which encapsulates this new functionality. This involves creating functions for retrieving an asset from the Data Store to the Client Application. Suppose the retrieve process is defined by the following function.

Object retrieveAsset(IDLAssetIDI anAssetID);

This function returns an asset of type Object using an argument, anAssetID, to define a unique identifier of the asset to be retrieved. The remaining interfaces, add, update, delete and query, may be similarly implemented.

Once an interface has been defined, the retrieveAsset function is also defined. This function will be used by the Client Application to retrieve data from the AMS. However, at this point, the AMS knows nothing about this function. The following step describes how this function is registered with the AMS.

iii. Define the Client Adapter Load Time Interface

Referring to FIG. 7, the new Client Adapter 705 is loaded when the Master Server 704 is started. There are a number of methods executed during this loading process. These load time methods are responsible for constructing a communication between the Master Server 704, Client Adapter 705 and Schema Adapter (or Schema Controller) 707. At load time the Master Server 704 calls the method, setServer on the Client Adapter 705. The Client Adapter 705 retains a handle to the Master Server 704 so that future calls can be made to the Master Server 704 from the Client Adapter 705. Each Client Adapter 705 is uniquely identified by an ID and given a descriptive name. Two methods, getViewID and getName, are defined on the Client Adapter 705 and are called by the Master Server 704 during the loading process. The newSession method will be described later. The Master Server 704 calls these two methods and builds a directory of all Client Adapters 705 in the system, thereby registering the Client Adapters 705. The IDLAbstractClientAdapterI interface is defined to be:

public interface IDLAbstractClientAdapterI extends java io.Serializable
{
void setServer(IDLMasterServerI AMS);
int getViewID();
String getName();
Object newSession(IDLActiveUserInfoI aNewSessionInfo) throws RemoteException;
} iv. Define the Client Adapter Run Time Interface

Before defining the steps necessary to construct a run time interface, a description of the run time relationships between the Client Application and AMS will be provided. Referring to FIG. 7, at load time the Master Client Adapter 701 is informed of the New Client Adapter 705 by the Master Server 704. Likewise at load time the Master Server informs the new Client Adapter 705 of any new Schema Controllers 707 and vice versa. Once the load registration is completed, methods/functions can be called between these objects.

Figure 8:
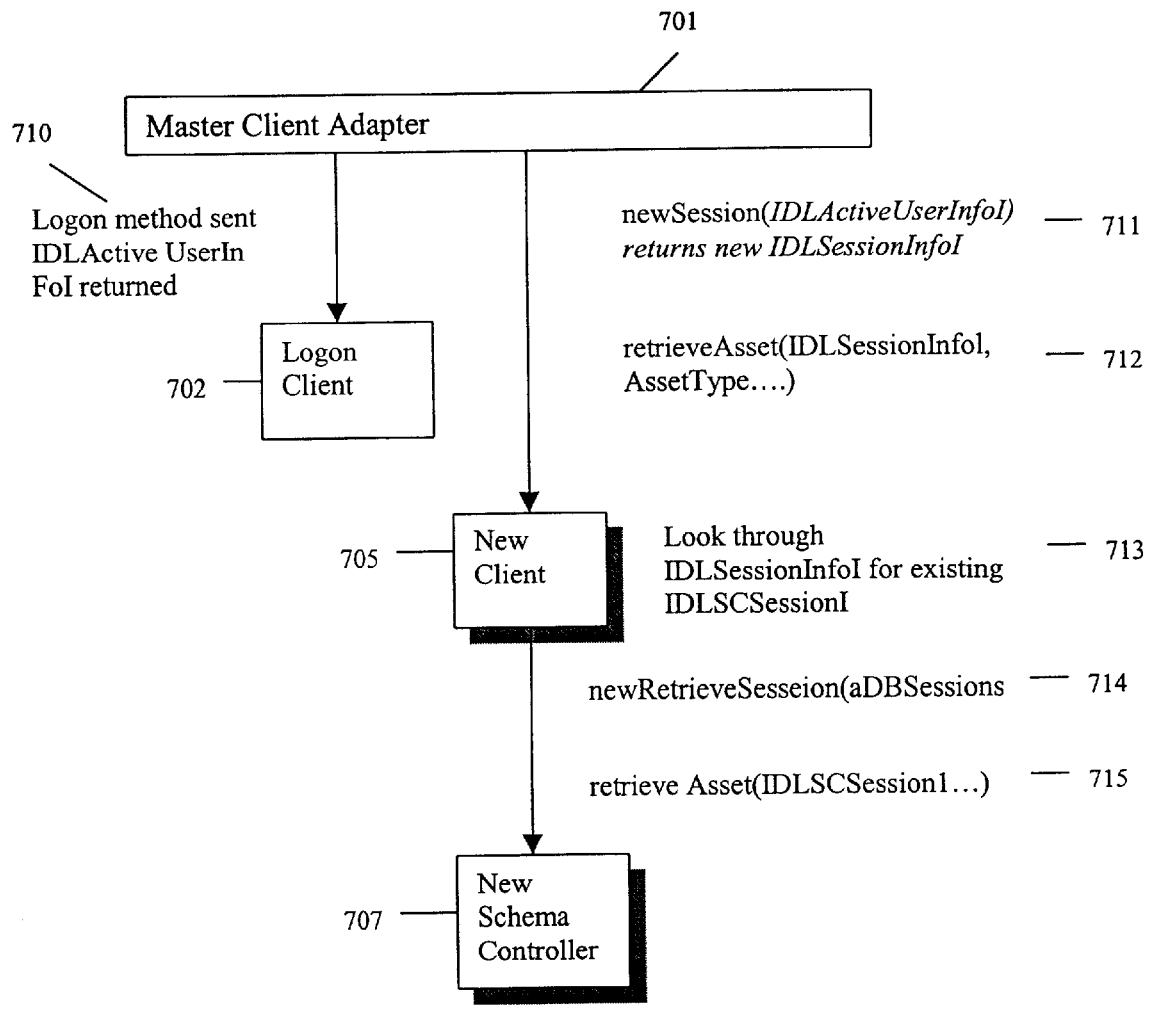
FIG. 8 illustrates an example showing portions of details of the asset management system shown in FIG. 1, along with an exemplary flow of functions through the system.

FIG. 8 shows the initial run time method calls. This interaction defines the responsibilities of the Client Adapter 705. These responsibilities are usually implemented by a developer when constructing a Client Adapter 705. Initially, the Master Client Adapter 701 initiates a logon to the AMS by calling a logon method 710 on the provided Logon Client Adapter 702. The Logon Client Adapter may be provided with the system, in which case, it does not need to be coded or modified by the developer. The logon method returns the IDLActiveUserInfoI structure to the Master Client Adapter. The IDLActiveUserInfoI is a structure that retains information regarding a particular Client Application's identity (e.g. hostname, username, etc.).

In this example, there is only one instance of any given Client Adapter 705 loaded at load time. Therefore, there is only one instance of a Client Adapter class in the system. This is not to say that there is only one Client Adapter in the system at a time, but rather only one instance of a particular class. Due to the fact there is only one instance of a Client Adapter class in this example, the Client Adapter must establish session connections to support multiple Client Applications logged on concurrently. This session information is stored in an IDLSessionlnfoI interface.

After the logon method 710 has completed, the Master Client Adapter 701 sends a newSession method 711 to the Client Adapter 705 to retrieve a new instance of the IDLSessionInfoI interface. The Master Client Adapter 701 or something else on the Client Application is responsible for storing the new instance of IDLSessionInfoI. This IDLSessionInfoI instance is then passed as the first argument to all future run time methods on the Client Adapter 705. In the present Word™ example, the retrieveAsset run time method was defined above. If the Master Client Adapter 701 received a request from the Client Application to retrieve an asset, the Master Client Adapter 701 calls the retrieveAsset method 712 providing the instance of IDLSessionInfo returned in the newSession method as well as the AssetType the Client Application is attempting to retrieve. The AssetType is another required argument for all run time methods in this example because each Client Adapter can have m Schema Controllers it can communicate with. Each Schema Controller is identified by this AssetType argument.

Similar to the Client Adapter, the Schema Controller has only one instance per class. Therefore, the Schema Controller also needs a session information concept so concurrent users can be supported in this example. The IDLSCSessionI provides the Schema Controllers session information. Each IDLSessionInfoI retains a group of IDLSCSessionIs, so existing sessions can be reused by other run time methods. Once the method retrieveAsset 712 is received by the Client Adapter 705, the Client Adapter 705 is responsible for looking through the group of IDLSCSessionIs 713 to see if one already exists for the AssetType provided. If so, that IDLSCSessionI is used as the first argument into the Schema Controller 707. In other words, the retrieveAsset method 715 is called with the existing IDLSCSessionI instance residing in the IDLSessinoInfoI If there is not an existing IDLSCSessionI defined for the AssetType then the newRetrieveSession method 714 is called with an argument of DBSessions. The DBSessions is provided in the IDLSessionInfoI. The newRetrieveSession method returns a new instance of IDLSCSessionI to the Client Adapter 705. The Client Adapter 705 adds this new instance to the IDLSessionlnfoI and proceeds to call the retrieveAsset 715 with this instance of IDLSCSessinoInfoI.

To construct a new Client Adapter 705, a developer or user should construct an interface that subclasses the IDLAbstractClientAdapterI interface. The new functions provided by the new Client Adapter 705 are defined in this interface. Continuing with the Word™ example, the retrieveAsset function is defined having the following signature:

Object retrieveAsset(IDLAssetIDI anAssetID);

The following three arguments should be added to the signature for an adequate Client Adapter: IDLSessionInfoI, AssetType and actionPath. The actionPath argument provides the context for a Plug-in that will be returned later. These three arguments are added and the new Client Adapter Interface is defined as follows:

Public interface IDLRetrieveClientAdapterI extends IDLAbstractClientAdapterI
{
  Object retrieveAsset(IDLSessionInfoI aSessionInfo,
      String anAssetType,
  IDLAssetIDI anAssetID, String actionPath) throws RemoteException;
}

The first and second arguments: aSessionInfo and anAssetType provide concurrent user and multiple Schema Adapter support. The IDLAssetIDI is the argument needed in the original retrieveAsset function, and actionPath defines the Action Path of the Plug-in. Plug-ins will be discussed in further detail below. The Action Path defines the type of object returned in the Object field to the Client Application and is passed on to the retrieveAsset method defined below in the Schema Adapter example.

The Client Adapter interface is now defined. Below are the definitions of the IDLSessionInfoI and IDLAction UserInfoI that are used frequently by the Client Adapter in providing its services.

The IDLAictiveUserInfol interface is defined to be:
public interface IDLActiveUserInfoI extends java.io.Serializable
{
  int getUserID();
  String getUserName();
  String getOrigin();
  Dictionary getDBSessions();
  Vector getActiveClientSessions();
  String getUID();
  void addMctiveClientSession(IDLSessionInfoI aSessionInfo);
}

The IDLSessionInfoI interface is defined to be:
public interface IDLSessionInfoI
{
  IDLActive UserInfoI getUserInfo();
  int getViewID();
  Hashtable getActiveSessions();
}

The getActiveSessions method defined on the IDLSessionInfoI is notable. When this method is called by the Client Adapter, a hashtable is returned. The hashtable contains the AssetTypes as keys and the IDLSCSessionI as values. This is the method needed by the Client Adapter to search for existing IDLSCSessionI prior to calling methods 714 or 715, as discussed above.

C. The Schema Adapter Module

Returning to FIG. 4, the Schema Adapter module 301 includes one or more Schema Adapters, where each Schema Adapter maps the Data Store 40 schema into assets of a particular asset type via an object oriented representation suitable for the Client Application 20. Each Schema Adapter may be a Java® class implementing high-level data requests to work with the particular asset type supported. Having detailed knowledge about the database model of the particular asset type, the Schema Adapter translates the high-level data requests to database requests applicable to the asset type.

Generally, one Schema Adapter corresponds to each asset type supported within the system 10. However, it is possible to have two or more Schema Adapters corresponding to a single asset type, where each of the two or more Schema Adapters stores data in a different manner. In one example, the Schema Adapter module 301 may include a Schema Adapter 311 to support documents in Word™ format, the asset type being MSWord. It is to be understood by those of ordinary skill in the art that, due to the configurable structure of the AMS 30, other Schema Adapters required by different asset types supported by the AMS 30 may be implemented within the Schema Adapter module 301.

D. Example: Creating and Adding New Schema Adapters

The configurability and extensibility of the present invention is further demonstrated by the ability to create and add new ones of the Schema Adapters in accordance with the following procedures.

In the following example, while a Schema Adapter may contain many Schema Controllers, only a single Schema Controller is used. Thus, in the following example, the terms Schema Adapter and Schema Controller will be used interchangeably.

A Schema Controller defines the communication between the AMS and the Data Store. Further, a Schema Controller is responsible for implementing the interfaces defined by the Client Adapters. Often a new Schema Controller is constructed for the purpose of supporting database operations for a new type of Asset (e.g. AssetType=MSWord). An AssetType is a placeholder for a file type. Another reason for constructing a new Schema Controller is to support a new schema for an existing type of Asset (e.g. AssetType=MSWord_Optimized). In the first case, a new file type, Word™, is to be supported, whereas in the second case, an asset type, Word™, has been previously constructed but the new Schema Controller defines an optimized query that is different from the first case.

New Schema Controllers are created and added in accordance with the following steps:
  i. Choose Asset Type(s) for the Schema Controller;
  ii. Define the User Interactions with the AMS;
  iii. Choose the Data Store(s) for the Asset Type(s);
  iv. Define the Schema Controller Load Time Interface;
  v. Use the User Interactions to define the Schema Controller Run Time Interface;
  vi. Implement a parser for the Asset Type(s) if necessary.
Each of these steps will now be discussed in detail.
  i. Choosing Asset Type(s) for the Schema Controller In this example, and as described above, suppose a user requests a new type of file to be stored into a digital library or some other Data Store. Furthermore, suppose this file is of type Word™. Word™ files store the content of a text document and the meta-data describing font size, color and typeface of each word in the document. This meta data also describes the page breaks, paragraph starting points, etc. The user's request may be satisfied by creating a new Asset Type, MSWord. This Asset Type defines the Schema Controller about to be constructed.
  ii. Define the User Interactions with the AMS Prior to defining the interfaces for the Schema Controller, the uses of the Schema Controller should be defined. As presented above, this is done by defining how the user will interact with the AMS. As discussed in the Client Adapter example above, a user may want to add, update, delete, retrieve and query Word™ documents on a number of properties defined in Word™ format. These properties of the MSWord file may include the text of the paragraphs, number of paragraphs and the number of pages.

After defining the properties the user may be interested in storing and querying those properties. A data model for storing this information can be constructed. From the previous discussion, a simple data model might be:
  MSWord File
  # of Pages
  # of Paragraphs
  List of Paragraphs
where a Paragraph is defined to be:
  Paragraph
  Text
  Both the Client Application interaction and the data model definition will be used to define the Schema Controller interface as well as define how to implement the interface.

iii. Choose the Data Store(s) for the Asset Type (s)

The next step is to choose the Data Stores that will be used to store and query the data. In the present example, the user may choose IBM's Digital Library®, IBM's DB2™ and IBM's Text Miner™ as three Data Stores. The usage of these three Data Stores becomes transparent to the user, as will become apparent.

iv. Define the Schema Controller Load Time Interface

Referring to FIG. 7, the Schema Controller 707 is dynamically loaded by the AMS at run time. During the dynamic loading process, the Schema Controller 707 registers with the AMS. This registration process consists of identifying those Client Adapter interfaces implemented by the Schema Controller 707. This is accomplished via the IDLSchemaControllerI interface. The Schema Controller 707 must subclass/implement (using Java®, for example) this interface. At load time, the methods defined below are executed. The result of this execution is that the proper Client Adapters 705 are informed of the new Schema Controller's 707 presence by the Master Server 704.

```
public interface IDLSchemaControllerI
{
void setServer(IDLMasterServerI AMS) throws RemoteException;
String getSchemaControllerName() throws RemoteException;
int getSchemaControllerID() throws RemoteException;
Vector getSchemaControllerAssetsTypes() throws RemoteException;
}
```

Each Schema Controller 707 is assigned a unique name and ID, which are returned by the methods getSchemaControllerName and getSchemaControllerID respectively. The setServer method saves a handle to the Master Server 704 for later use by the Schema Controller 707. The getSchemaControllerAssetsTypes method defines the Client Adapters 705 a Schema Controller 707 is associated with. This is accomplished through the vector returned by the getSchemaControllerAssetsTypes method. This vector contains one or more instances of IDLAssetTypeJ.

```
public class IDLAssetTypeJ
{
  public String getName();
  public void setName(String asName);
  public int getID();
  public void setID(int aiID);
  public boolean is ViewSupported(int aiViewID);
  public String getViewSchemaController(int aiViewID);
  public void addViewSchemaController(int aiViewID, String asSubController);
  public Hashtable getAllSupportedViews();
}
```

The getName and getID methods answer the sender with the unique name and ID of the specified Asset Type respectively. The setName and setID methods set the name and ID returned by the getName and getID methods. The is ViewSupported method returns a boolean depicting whether or not a Client Adapter 705 is supported by a Schema Controller 707 for the specified Asset Type. The getViewSchemaController, addViewSchemaController and getAllSupportedViews methods manipulate and query the Client Adapters 705 supported by a Schema Controller 707 for the specified Asset Type. The getViewSchemaController method answers the sender with the name of the Schema Controller 707 given a specific Client Adapter identifier. The addViewSchemaController method populates the list of Client Adapter identifier/Server Controller name pairs. The getAllSupportedViews method answers the sender with a hashtable. This hashtable contains the Client Adapter identifiers as its keys and the Schema Controller name as its values.

The Schema Controller name and ID are different than the name and ID assigned to an Asset Type. In this example the Asset Type is "MSWord". A unique name and ID for the Asset Type is "MSWord" and 20 respectively. A Schema Controller name and ID is "Microsoft Word1" and 5 respectively. By separating the concept of data types being stored (Asset Type) from the manner in which it is stored (Schema Controller), a great deal of flexibility is provided. Other configurations could be:

m Asset Types being stored using one Schema Controller;
1 Asset Type stored m ways using m Schema Controllers;
1 Asset Type stored using 1 Schema Controller.

Based on these configurations the relationship between Asset Types and Schema Controllers 707 is m to m.

The IDLAssetTypeJ instances are initialized by Schema Controllers 707. These instances define the Client Adapters 705 supported by each Schema Controller 707. The simple case has one object in the getSchemaControllerAssetsTypes vector, meaning the Schema Controller 707 supports one Asset Type. However, it is quite possible for a more complex Schema Controller to support several Asset Types.

For the Schema Controller 707 to create and populate an instance of IDLAssetTypeJ, it must know the unique identifier for the Client Adapter 705. This is accomplished by querying the AMS. A pointer to the AMS is stored in the Schema Controller 707 by the setServer method. Once a Schema Controller 707 is registered, its run time interface can be exercised to accomplish tasks for the Client Application.

v. Define the Schema Controller Run Time Interface

The next step is to define the Schema Controller run time interface(s). As discussed above, in this example, it is assumed that the user wishes to add, update, delete, retrieve and query Word™ files. The Client Application separates these five functions into five separate windows. Therefore, five Client Adapters 705 can be implemented: AddCA, UpdateCA, DeleteCA, RetrieveCA and QueryCA. The Schema Controller 707 is responsible for implementing the methods defined on each of these five Client Adapters 705. Thus, the Schema Controller 707 must subclass/implement (using Java®, for example) these five interfaces.

To better understand the API of the Schema Controller 707, initially, the communication between the Client Adapter 705 and the Schema Controller 707 will be reviewed. In the Client Adapter example, discussed above, the newSession method defined for the Client Adapter 705 was discussed. The implementation of newSession produces an instance of IDLSessionInfoJ that is returned to the Client Adapter 705. This instance retains all of the IDLSCSessionInfoJ instances that are constructed by the Schema Controller 707 newxxxSession methods. These methods will be discussed later. The IDLSCSessionInfoJ instances provide the Schema Controller 707 with context information allowing the Schema Controller 707 to complete the requested task for the proper AMS session. This context information often appears as Data Store logins. In other words, handles to active connections to Data Stores (e.g. DB2®, Text Miner™, digital library). Data Store logins are also discussed below.

The newSession has a single argument, aSessionInfo, containing the Data Store logins. These are used to create the AMS session, IDLSessionInfo. The IDLSCSessionInfoJ that is produced by the Schema Controller 707 also retains the Data Store logins. In the present example, all methods on the Client Adapter 705 and Schema Controller 707 are stateless. That is, the session state must be passed as an argument for each call. The IDLSessionInfoI and IDLSCSessionInfoI are used to pass the state information to the Client Adapter 705 and Schema Controller 707 respectively. The Client Adapter 705 must send session information to the Schema Controller 707 in each method call. The convention is to make session information the first argument in all Schema Controller methods.

In this example, the newSession method does not logon to the Data Store, but rather expects the Data Store connections to be previously connected. Other implementations of Client Adapters 705 and Schema Controllers 707 may defer logon till the execution of the newSession method.

In the present examples, one Schema Controller 707 interface interacts with the Client Adapter 705. The IDLSCSessionI interface defines the Schema Controller 707 state information and is the first argument for all Schema Controller methods. This interface is populated by the Schema Controller 707, but can be queried by the Client Adapter 705. public interface IDLSCSessionI extends java.io.Serializable
{
int get ViewID();
int getSessionID();
Dictionary getDBSession();
Hashtable getproperties();
void setProperty(String asPropertyName, Object ao Value);
}

Instances of objects implementing the IDLSCSessionI interface are constructed when a newxxxSession is executed on the Schema Controller 707. Where xxx is the name of the session type (e.g. Query, Add, Update, Delete, Retrieve). The getViewID method returns the unique identifier of the Client Adapter 705 responsible for this interface. The getSessionID method returns the unique identifier of the IDLSCSession instance. The getDBSession method returns a dictionary. This dictionary was passed to the newxxxSession call and populated in this instance. The getProperties and setProperty methods query and manipulate a hashtable of properties respectively. This hashtable is used to store state information specific to a Schema Controller 707.

In the present Word™ example, the Schema Controller 707 implements six interfaces: AddSC, UpdateSC, DeleteSC, RetrieveSC, QuerySC and IDLSchemaControllerI. IDLSchemaControllerI was previously defined. Below, the RetrieveSC interface will be defined. The remainder of the interfaces can be similarly defined. In the retrieve scenario, the user of the client application wishes to retrieve the assets they have previously stored. Typically a user will query the Data Store to locate the asset of interest to them. This asset is identified by a unique identifier, IDLAssetIDI. The method, newRetrieveAsset, constructs a new AMS session for the client application request. This allows multiple users concurrent access to the Schema Controller 707 implementing this interface, where each user has a unique session with the Schema Controller 707.
{
   IDLSCSessionI newRetrieveSession (Dictionary aDBSessions) throws RemoteException;
   Object retrieveAsset(IDLSCSessionI aSessionInfo, IDLAssetIDI anAssetID, String actionPath) throws RemoteException;
}

Two services have been constructed in the AMS to aid a developer in defining the five interfaces, as well as implementing them. Plug-ins and DataStore objects are available via the external services portion of the AMS. Plug-ins are used to share information between the Client Application and Schema Adapter. This can be either returning data to a Client Application or to update or add data to the Data Store. The DataStore objects define standardized Data Store operations (login, logoff, etc.).

When returning data to a Client Application from the Schema Adapter, a developer should decide what type of Plug-in to use. Both the Client Application and Schema Adapter should be developed with a specific Plug-in interface or set of Plug-in interfaces in mind. A Plug-in can be implemented as any Javag class implementing a specific Java® interface.

The Master Server 704 manages a list of Plug-in templates, which are dynamically loaded at run time. The set of Plug-in templates is dependent on which Schema Controllers 707 are loaded and what Plug-ins are needed by the loaded Schema Controllers 707. The Master Server 704 provides a method, getPlug-in, which automatically creates an instance of a specified Plug-in template (Java® class). The Plug-in template is specified using a Domain and an Action Path. The Domain is discussed in detail in the Plug-in example, but basically defines the data type (e.g. String, int, long, etc.) supported by the Plug-in. The Action Path defines the context of the Plug-in, which is usually defined by the Client Application.

By specifying Plug-in templates via the Domain and Action Path, a great amount of flexibility is enabled between the Client Application and Schema Adapter. For example, suppose it is desired to have two types of Client Applications, a Console Application and a Windows® Application, communicate with the same Schema Controller. The Console Application presents data in a textual form, whereas the Windows® Application presents the data in a graphical way using Windows®. This results in the need for different Plug-ins templates, depending on which Client Application is requesting information. The Console Application passes an Action Path, TEXT, to the Schema Controller. The Schema Controller uses this Action Path and the Domain embedded into both the Schema Controller and Client Application to determine which Plug-in template to create an instance of. In this case, the getPlug-in method is called on the Master Server with the domain String and Action Path TEXT and an instance of class Javalang.String is returned. This class is easily returned to a console application and displayed.

The Windows® Application passes an Action Path, GUI, to the Schema Controller. In this case the Master Server getPlug-in method returns an instance of java.awt.Label. This instance can be shown directly into a spread sheet grid in a Windows® application.

It is possible, and sometimes necessary, for the Client Application to pass a piece of the Action Path to the Schema Adapter and then have the Schema Controller complete the path. A simple example would be to make the first piece of the Action Path describe the context for which the Client Application plans on using the Plug-in, such as "GUI". This is then added to by the Schema Controller to request an appropriate "GUI" control for the data. So for a piece of data that is being display that is just a string, the Domain would be String and the full Action Path would be "GUI_LABEL". When a new Plug-in template is added to the Master Server, it needs to be configured and given an Action Path before it can be used.

The newly created object that is returned by the Master Server is actually a container object that is used to wrap the Plug-in instances. Often times, the Schema Controller or Client Application will need to set values within a Plug-in instance prior to passing the instance. Each Plug-in instance contains a Domain and a Value. The Domain of the instance contains all the values this instance can hold, whereas the Value field is the actual value of this instance. The interface for getting/setting the Domain and Value fields will be defined in the Plug-in example, presented below. Note that the Domain of the Plug-in instance is different than the Domain of the Plug-in template discussed previously.

DataStore services provide the connection to the Data Store. Often this connection requires a handle or login to allow manipulation of data in that store. This being the case, the newxxxSession method takes a dictionary of such objects to facilitate using the Data Store. The Schema Controller must look up the Data Store object needed and retrieve the object from the hashtable. When creating a Schema Controller, if a Data Store login type does not exist for the Data Store planned on being used, then one must be created. This is done by subclassing the interface:

public interface IDLDBLogonTypeI
{
Object logon (Dictionary adParams) throws IDLLogonFailedJ;
void logoff(Object aoSession) throws IDLLogoffFailedJ;
Vector getParams();
String getName();
}

The getName method returns the unique name of this Data Store. This value is looked up by the Schema Controller. The getParams method returns a vector of the parameters needed to logon in the logon method. The logon method should take a dictionary of the parameters to logon and their corresponding values. This method should then return the object that will be used by Schema Controllers to communicate with the Data Store. The logoff method takes the object produced by the logon method and performs a logoff from the Data Store. By using this mechanism the Data Store connections are transparent to the Client Application. The System Administrator of the AMS and the developer of the Schema Adapter are the only places where knowledge of the Data Stores being used is needed.

vi. Implement a Parser for the Asset Type(s)

Some Asset Types require a parser to extract properties and their values from a file or stream. In this example, the MSWord file contains paragraphs, page counts, fonts, etc. So as to avoid having the user enter this information when adding an MSWord file to the Data Store, a parser may be constructed to automatically extract the property information from the file. Each parser may be different and is dependent on factors such as which platform the client/server are on, what file type is being manipulated and many others. Most parsers will be exercised during the adding of the asset into the Data Store. This is because the parser is used to populate the Data Store.

The opposite of a parser, also known as an importer, is an exporter. An exporter is used to construct a file from the data in the Data Store. This is rarely required since the purpose of Digital Library is to store files, but there exist situations where users wish to change data within the Data Store and have it reflected within the file. If a user wished to change a paragraph within an MSWord file within the AMS Client Application and have it reflected in the MSWord file, an exporter would have to transfer the data in the Data Store to the MSWord file. This would often times appear in the retrieveAsset method.

E. The Resources Module

As shown in FIG. 4, the Resources module 302 includes one or more Plug-ins 312 and one or more External Services adapters 322. The Resources module 302 holds all the available producible Plug-ins for the entire system 10. Plug-ins 312 are structures used for transferring data between the AMS 30 and the Client Application 20. In one implementation of the present invention, the Plug-ins 312 may be Java® classes used to encapsulate property values with associated behaviors sent from the AMS 30 to the AMC 200 and shown to the user. In other words, a Plug-in may be a class defining an instance returning data from a database using object oriented classes. Each Plug-in configuration requires specified property types and Action Paths. A property type represents the type of Data Stored in a digital library 401 part of the Data Store 40 (shown in FIG. 5), for example. In conjunction with the property type, an Action Path identifies the specific Plug-in for client requests. Multiple Action Paths can be defined for each Plug-in, and multiple property types can be associated with each Action Path. The query 310, results 320, and edit 330 Client Adapters use Plug-ins 312 to transfer information to the AMC 200 of the Client Application 20. At the same time, the AMC 200 uses Plug-ins 312 to display and edit the property values received from the AMS 30. When the user is editing the values using the edit function 2104 (shown in FIG. 2) of the user interface 210, Plug-ins 312 are called to return updated values from the AMC 200 to the AMS 30. Plug-ins 312 may be created for a windowing environment, and may also be non-visual, containing information to perform the required functions of transferring data between different components of system 10.

When the user wants to query the system 10, for example, the AMC 200 sends a request to a Client Adapter in the Client Adapter module 300 using a property name and an Action Path. The Client Adapter contacts a Schema Adapter within the Schema Adapter module 301. The Schema Adapter module 301 of the AMS 30 retrieves a property type based on the property name and uses the request, the property type, and the Action Path to identify and request a specific Plug-in in the Resources module 302. Finally, the Schema Adapter module 301 within the AMS 30 produces an instance of the Plug-in produced by the Resources module 302, initializes that particular instance, and sends the instantiated Plug-in to the AMC 200 via the Client Adapter module 300.

The External Services adapters 322 of the Resources module 302 may be used to establish a connection with the Data Store 40 and function as a link between the Schema Adapter module 301 and the Data Store 40. Among other features, the External Services adapters 322 incorporate the DataStore services, discussed above in the Schema Adapter example, to logon to and logoff from the Data Store 40 and facilitate communication with the Data Store 40. The AMS 30 uses External Services adapters 322 required by the asset types supported within the AMS 30.

F. Example: Creating and Adding New Plug-ins

The configurability and extensibility of the present invention is further demonstrated through the ability to create and add new ones of the Plug-ins in accordance with the following procedures.

Before learning how to construct a new Plug-in, it is helpful to understand how the components shown in FIG. 7 work together. The Master Server 704 manages a list of Plug-in templates via the Plug-in Factory 708 (part of the Plug-ins module 312 of FIG. 4). These Plug-in templates are dynamically loaded when the Master Server 704 is started.

The set of Plug-in templates may be configured by a System Administrator. This set should encompass all the Plug-in templates required by the loaded Schema Controllers.

The Schema Controller 707 calls the Master Server's 704 method, getPlug-in, which automatically creates a remote Plug-in Container 709. This remote Plug-in Container is of a specified Plug-in template (Java® class). The Plug-in template is specified using a Domain and an Action Path. The Domain defines the data type (e.g. String, int, long, etc.) the Plug-in supports. As discussed above, the Action Path defines the context of the Plug-in. The first portion of the Action Path is usually defined by the Client Application and the remainder of the Action Path may be filled out by the Schema Controller 707. As discussed above, the third argument of the retrieveAsset method is the Action Path. This provides the Client Application with the opportunity to pass the beginning of the Action Path to the Schema Controller 707.

Public interface IDLRetrieveSCI
{
    IDLSCSessionI newRetrieveSession(Dictionary aDBSessions) throws RemoteException;
    Object retrieveAsset(IDLSCSessionI aSessionInfo, IDLAssetIDI anAssetID, String actionPath) throws RemoteException;
}

After the remote Plug-in Container 709 is constructed by the Master Server 704, it is returned to the Schema Controller 707. The Schema Controller 707 sets the domain and value of the remote Plug-in Container 709 and returns it to the Client Adapter 705.

In the AMS of this example, the Java® communications class library, Remote Method Invocation (RMI), is being used to pass remote objects between distributed virtual machines. Due to performance reasons specific to RMI, a local representation is constructed in the Client Application of the remote Plug-in Container. These local representations are known as Local Plug-ins (not shown).

Now, the steps for creating and adding new Plug-ins will be discussed:
    i. Choose a Plug-in template (e.g. Java® class) that would be the best implementation for the Client Application;
    ii. Choose the Domain of the Plug-in instance;
    iii. Implement the get and set methods;
    iv. Implement the RMI remote/local methods
    i. Choose a Plug-in Template As discussed above, when returning data to a Client Application from the Schema Adapter, a developer should decide what type of Plug-in to use. Both the Client Application and Schema Adapter should be developed with a specific Plug-in interface or set of Plug-in interfaces in mind. A Plug-in can be implemented as any Java® class implementing a Java® interface, for example.

Continuing with the Word™ example, assume that the Client Application is a Windows NT® application that displays the results of a user's queries in a grid. This grid, which is implemented as a Java® AWT grid control, uses Java® class, NdLabel, to display cells. Therefore, a subclass of the NdLabel is chosen as the Plug-in template. A subclass of NdLabel is chosen because NdLabel (implement interfaces, etc.) needs to be changed, as will be seen below.

Also, the domain and value of the Plug-in template should be defmed. In the present example, numerous properties (e.g. number of paragraphs, etc.) are returned using the Ndlabel class. In the case of the number of paragraphs, the domain is a set of numbers, whereas the paragraph itself is just a set of text. Thus, each property has a different domain, but they all can be represented as strings. Therefore, the NdLabel template domain can be defined to a blank String and the Value is a blank String.
    ii. Choose the Domain of Plug-in instance The domain of the Plug-in instance is more specific than the template. This is because at compile time it is known what property a Plug-in instance is being applied to. In the Word™ example, one of the properties is the number of paragraphs for a document. Assuming the minimum for the number of paragraphs is 0 and the maximum is 1000, the domain for NdLabel instance is string representations of integers between 0 and 1000. The Schema Controller uses the Data Stored in the Data Store to fill out the value of the NdLabel instance prior to returning it to the Client Adapter.
    iii. Implement the Get/Set Methods for the Plug-in Writing a Plug-in in the present example involves implementing one Java® class. This class will define the behavior for the Plug-in, but to work in the AMS it must also implement the Java® interface:
public interface IDLValuePlug-inI
{
    IDLContainerI getAllSupportedDomains() throws RemoteException;
    IDLContainerI getDomain() throws RemoteException;
    void setDomain(IDLContainerI aDomainContainer) throws RemoteException;
    IDLContainerI getPlug-in Value() throws RemoteException;
    void setPlug-in Value(IDLContainerI aValueContainer) throws RemoteException;
    public void update();
}

The method getAllSupportedDomains returns an object of type IDLContainerI. This object is quite similar to the class Vector, defined in Java®, in that it contains an ordered set of objects. This method returns all of the different domains a specified Plug-in template can support. For example, a Textfield can support Strings, Integers, Floats, etc. The interface Plug-in.IDLValuePlug-inConstantsI provides a common set of these types that are already defined as constants. Each template domain is added to the IDLContainerI as a string.

The method getDomain also returns an IDLContainerI. This method is used to return the domain of the Plug-in instance. In some cases, the Plug-in will be given a set of choices as its domain. An example of this would be a Listbox.

The method setDomain is used to define the domain of the Plug-in instance. Often times this method is called by the Schema Controller or Client Adapter. An example is a Textfield that is configured with an Integer domain. This allows the Textfield Plug-in to ignore or generate errors for any input that is not numeric. The Domain can also be a set of things as in the case of a Listbox.

Calling getPlug-inValue results in the Plug-in instance returning the value set by setPlug-in Value. In some cases, this could be a set of things such as for a multi-select Listbox. The method setPlug-inValue sets the Plug-in instance value. This value is retrieved via the getPlug-inValue method. The update method is used to inform the Plug-in that its contents are to be sent back to the server from the client for processing.
    iv. Implement the RMI Local/Remote Methods for the Plug-ins As discussed previously, the AMS makes use of Java'® RMI for purposes of distributing the Client Application and Server. Due to the nature of RMI, local copies of the remote Plug-in Container are constructed on the Client Application. An interface, IDLValuePlug-inStubI, defines the methods necessary for the Client Application to construct a local copy of the remote Plug-in Container. Each Plug-in template should implement this interface.

public interface IDLValuePlug-inStubI extends java.io.Serializable
{
Object createLocalPI(boolean abValueSet);
void update();
Object getRemotePIContainer();
}

Referring to FIG. 7, the getRemotePIContainer method answers the sender with an instance of the remote Plug-in Container 709. This method is called by the Schema Controller 707 after the getPlug-in method is sent to the Master Server 704. The Schema Controller 707 calls the setPlug-inValue and setDomain methods on the remote Plug-in Container 709. The remote Plug-in Container 709 returns the remote Plug-in Container 709 to the Client Adapter 705. The Client Adapter 705 calls the createLocalPI method to construct the local Plug-in (not shown) on the Client Application. The Client Adapter 705 returns the object which is produced by that method to the Client Application, and also maintains the connection between the local Plug-in (not shown) and the remote Plug-in Container 709.

III. Example: Operation in the Overall Architecture

While portions of the operation in the overall architecture have been provided above, the following discussion provides a more complete system view of an exemplary operation.

Referring to FIG. 7, the Client Application contains the following services, previously discussed, which facilitate communication with the AMS: Master Client Adapter 701, Logon Client Adapter 702 and Master Server Adapter 703 facilitating. Each of these services is embedded in the Client Application. When creating a new Client Adapter 705, for example, interfaces for Client Adapter 705 and Schema Controller 707 must be defined.

The Logon Client Adapter 702 is provided by default. This Adapter 702 is used to establish the connection between the Client Application and the AMS. In a typical usage scenario, the Client Application sends a newSession method to the Master Client Adapter 701. The argument of the newSession method is a unique identifier used in locating a particular Client Adapter. In this case, the Client Application is requesting the Logon Client Adapter 702, which is returned to the Client Application. When the Client Application is started, the Logon Client Adapter 702 may be the only Client Adapter loaded.

The Client Application then sends a logon message to the Logon Client Adapter which in turn constructs the Master Server Adapter 703 and an instance of IDLActive UserInfo. The IDLActive UserInfo interface does not appear in FIG. 7, but it is a unique definition representing the Client Application's connection to the AMS.

Next, the Client Application sends a getSessionTypes method to the Master Client Adapter 701. The Master Client Adapter 701 passes the getSessionTypes method on to the Master Server 704. The Master Server 704 returns a list of Client Adapters 705 to the Master Client Adapter 701 and then on to the Client Application. The Client Application sends a newSession message to the Master Server Adapter 703 providing the unique ID of the desired Client Adapter 705. The Master Client Adapter 701 registers the new Client Adapter 705.

The user, through the Client Application, can now call any of the new functions specified in the new Client Adapter 705. If a new function is called in the new Client Adapter 705, a query for example, the new Client Adapter 705 passes this request to the appropriate Schema Controller 707.

Once the Schema Controller 707 receives a request, it uses resources in the AMS to fulfill that request by connecting to the Data Store 716, where the request is processed in a relational database in the Data Store 716, for example. The relational database then processes the request and sends results back to the Schema Controller 707. The Schema Controller 707 then, already having requested an appropriate Plug-in 709 from the Plug-in Factory 708 for the data type being processed, populates the Plug-in 709 which is then forwarded back to the Client Adapter 705 and the Client Application. When a Client Application wishes to engage a different Client Adapter 705 or a new instance of an existing Client Adapter 705, it must send the newSession message and go through the same process as defined above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A flexibly adaptable asset management system for deploying asset management functions to a client application for browsing and manipulating assets, representing data, in a data store, the system comprising:

an asset manager server disposed between the client application and the data store, the asset manager server including:

at least one client adapter for providing interface functions between the client application and the asset manager server;

at least one schema adapter for mapping the assets to the data stored in the data store, and for transferring the data to and from the data store in response to methods invoked in the client application, the methods being received by the at least one schema adapter through the at least one client adapter; and at least one object oriented class, wherein instances of the at least one object oriented class are used for transferring the data between the at least one schema adapter and the client application through the at least one client adapter, wherein, at least two of the client adapter, schema adapter and object oriented class are flexibly adaptable, thereby allowing the system to do one or more of handle different asset types, handle additional client applications and provide dynamic interfaces.

2. The system according to claim 1, wherein the at least one schema adapter is specific to a particular one of the assets, an asset being meta data for a particular data type.

3. The system according to claim 1, wherein the interface functions include querying, retrieving and manipulating assets.

4. The system according to claim 1, wherein the client adapter further provides for file transfer between the client application and the asset manager server.

5. The system according to claim 1, further comprising external services for providing a link between the at least one schema adapter and the data store.

6. The system according to claim 1, wherein the at least one client adapter and the at least one schema adapter are flexibly adaptable.

7. The system according to claim 1, wherein the at least one client adapter and the at least one object oriented class are flexibly adaptable.

8. The system according to claim 1, wherein the at least one schema adapter and the at least one object oriented class are flexibly adaptable.

9. The system according to claim 1, wherein the at least one client adapter, the at least one schema adapter and the at least one object oriented class are each flexibly adaptable.

10. The system according to claim 1, wherein:
the client application invokes a first one of the methods on the asset manager server;
the at least one client adapter invokes a series of subsequent ones of the methods for querying the client application for information regarding a task to be performed on the data in the data store;
the schema adapter obtains results for the task;
the results are encapsulated into one of the at least one object oriented class; and
the results encapsulated into one of the at least one object oriented class are returned to the client application through the at least one client adapter.

11. A method for adaptively deploying asset management functions in an asset management system to a client application for browsing and manipulating assets, representing data, in a data store, the system comprising:
an asset manager server disposed between the client application and the data store, the asset manager server including:
at least one client adapter for providing interface functions between the client application and the asset manager server;
at least one schema adapter for mapping the assets to the data stored in the data store, and for transferring the data to and from the data store in response to methods invoked in the client application, the methods being received by the at least one schema adapter through the at least one client adapter; and
at least one object oriented class, wherein instances of the at least one object oriented class are used for transferring the data between the at least one schema adapter and the client application through the at least one client adapter,
wherein, at least two of the client adapter, schema adapter and object oriented class are flexibly adaptable, thereby allowing the system to do one or more of handle different asset types, handle additional client applications and provide dynamic interfaces,
wherein the method comprises:
the client application invoking a first one of the methods on the asset manager server;
the at least one client adapter invoking a series of subsequent ones of the methods for querying the client application for information regarding a task to be performed on the data in the data store;
the schema adapter obtaining results for the task;
encapsulating the results into one of the at least one object oriented class; and
returning the results encapsulated in the one of the at least one object oriented class to the client application through the at least one client adapter.

12. The method according to claim 11, wherein the at least one schema adapter is specific to a particular one of the assets, an asset being meta data for a particular data type.

13. The method according to claim 11, wherein the interface functions include querying, retrieving and manipulating assets.

14. The method according to claim 11, wherein the client adapter further provides for file transfer between the client application and the asset manager server.

15. The method according to claim 11, further comprising external services for providing a link between the at least one schema adapter and the data store.

16. The method according to claim 11, wherein the at least one client adapter and the at least one schema adapter are flexibly adaptable.

17. The method according to claim 11, wherein the at least one client adapter and the at least one object oriented class are flexibly adaptable.

18. The method according to claim 11, wherein the at least one schema adapter and the at least one object oriented class are flexibly adaptable.

19. The method according to claim 11, wherein the at least one client adapter, the at least one schema adapter and the at least one object oriented class are each flexibly adaptable.

20. A program storage device readable by a computer, tangibly embodying a program of instructions executable by the computer to perform method steps for adaptively deploying asset management functions in an asset management system, to a client application for browsing and manipulating assets, representing data, in a data store, the system comprising:
an asset manager server disposed between the client application and the data store, the asset manager server including:
at least one client adapter for providing interface functions between the client application and the asset manager server;
at least one schema adapter for mapping the assets to the data stored in the data store, and for transferring the data to and from the data store in response to methods invoked in the client application, the methods being received by the at least one schema adapter through the at least one client adapter; and
at least one object oriented class, wherein instances of the at least one object oriented class are used for transferring the data between the at least one schema adapter and the client application through the at least one client adapter,
wherein, at least two of the client adapter, schema adapter and object oriented class are flexibly adaptable, thereby allowing the system to do one or more of handle different asset types, handle additional client applications and provide dynamic interfaces,
wherein the method comprises:
the client application invoking a first one of the methods on the asset manager server;
the at least one client adapter invoking a series of subsequent ones of the methods for querying the client application for information regarding a task to be performed on the data in the data store;
the schema adapter obtaining results for the task;
encapsulating the results into one of the at least one object oriented class; and
returning the results encapsulated into one of the at least one object oriented class to the client application through the at least one client adapter.

21. The program storage device according to claim 20, wherein the at least one schema adapter is specific to a particular one of the assets, an asset being meta data for a particular data type.

22. The program storage device according to claim 20, wherein the interface functions include querying, retrieving and manipulating assets.

23. The program storage device according to claim 20, wherein the client adapter further provides for file transfer between the client application and the asset manager server.

24. The program storage device according to claim 20, further comprising external services for providing a link between the at least one schema adapter and the data store.

25. The program storage device according to claim 20, wherein the at least one client adapter and the at least one schema adapter are flexibly adaptable.

26. The program storage device according to claim 20, wherein the at least one client adapter and the at least one object oriented class are flexibly adaptable.

27. The program storage device according to claim 20, wherein the at least one schema adapter and the at least one object oriented class are flexibly adaptable.

28. The program storage device according to claim 20, wherein the at least one client adapter, the at least one schema adapter and the at least one object oriented class are each flexibly adaptable.

29. A method of adaptively deploying asset management functions to a client application for manipulating assets, representing data, in a data store, the method comprising the steps of:

the client application connecting to an asset manager server, the asset manager server being disposed between the client application and the data store;

the client application selecting an asset type of one of the assets corresponding to a specific schema adapter, wherein the schema adapter is disposed within the asset manager server;

the client application requesting and being provided with a listing of all available client adapters, the client adapters being disposed within the asset manager server and providing interface functions specific to the selected asset type and for providing communications services to support an interface between the client application and the asset manager server;

the client application selecting one of the client adapters, and as a result, the client application being provided with an instance of the selected one of the client adapters as an application program interface;

calling a function specified in the instance of the selected one of the client adapters;

passing the called function to the schema adapter;

the schema adapter processing the called function, when results of the function are requested, by obtaining the data from the data store;

the schema adapter requesting the production of an instance of an object oriented class, wherein an object oriented class encapsulates the data and associated behaviors needed to transfer and present the data obtained from the data store to the client application;

the schema adapter populating the produced instance of the object oriented class with the data obtained from the data store; and forwarding the populated instance of the object oriented class to the client application through the instance of the selected one of the client adapters for usage by the client application;

wherein, at least two of the client adapters, schema adapter and object oriented class are flexibly adaptable, thereby allowing the system to handle different asset types and additional client applications and thereby providing dynamic interfaces.

30. The method according to claim 29, wherein the step of connecting to the asset manager server comprises the steps of:

the client application providing logon information to the asset manager server;

the client application contacting the asset manager server for a connection; and establishing the connection between the asset manager server and the client application.

31. The method according to claim 29, wherein the client adapters and the schema adapter are flexibly adaptable.

32. The method according to claim 29 wherein the client adapters and the object oriented class are flexibly adaptable.

33. The method according to claim 29, wherein the schema adapter and the object oriented class are flexibly adaptable.

34. The method according to claim 29, wherein the client adapters, the schema adapter and the object oriented class are each flexibly adaptable.

35. A program storage device readable by a computer, tangibly embodying a program of instructions executable by the computer to perform method steps for adaptively deploying asset management functions to a client application for manipulating assets, representing data, in a data store, the method comprising the steps of:

the client application connecting to an asset manager server, the asset manager server being disposed between the client application and the data store;

the client application selecting an asset type of one of the assets corresponding to a specific schema adapter, wherein the schema adapter is disposed within the asset manager server;

the client application requesting and being provided with a listing of all available client adapters, the client adapters being disposed within the asset manager server and providing interface functions specific to the selected asset type and for providing communications services to support an interface between the client application and the asset manager server;

the client application selecting one of the client adapters, and as a result, the client application being provided with an instance of the selected one of the client adapters as an application program interface;

calling a function specified in the instance of the selected one of the client adapters;

passing the called function to the schema adapter;

the schema adapter processing the called function, when results of the function are requested, by obtaining the data from the data store;

the schema adapter requesting the production of an instance of an object oriented class, wherein an object oriented class encapsulates the data and associated behaviors needed to transfer and present the data obtained from the data store to the client application;

the schema adapter populating the produced instance of the object oriented class with the data obtained from the data store; and forwarding the populated instance of the object oriented class to the client application through the instance of the selected one of the client adapters for usage by the client application, wherein, at least two of the client adapters, schema adapter and object oriented class are flexibly adaptable, thereby allowing the system to handle different asset types and additional client applications and thereby providing dynamic interfaces.

36. The program storage device according to claim 35, wherein the step of connecting to the asset manager server comprises the steps of:

the client application providing logon information to the asset manager server;

the client application contacting the asset manager server for a connection; and establishing the connection between the asset manager server and the client application.

37. The program storage device according to claim 35, wherein the client adapters and the schema adapter are flexibly adaptable.

38. The program storage device according to claim 35, wherein the client adapters and the object oriented class are flexibly adaptable.

39. The program storage device according to claim 35, wherein the schema adapter and the object oriented class are flexibly adaptable.

40. The program storage device according to claim 35, wherein the client adapters, the schema adapter and the object oriented class are each flexibly adaptable.

41. A system for adaptively deploying asset management functions to a client application for manipulating assets, representing data, in a data store, the system comprising:

an asset manager server disposed between the client application and the data store, the asset manager server including client adapters, schema adapters and object oriented classes, wherein:

the client application connects to the asset manager server;

the client application selects an asset type of one of the assets corresponding to a specific one of the schema adapters;

the client application requesting and being provided with a listing of all the client adapters, the client adapters providing interface functions specific to the selected asset type and further providing communications services to support an interface between the client application and the asset manager server;

the client application selects one of the client adapters, and as a result, the client application is provided with an instance of the selected one of the client adapters as an application program interface;

a function specified in the instance of the selected one of the client adapters is called;

the called function is passed to one of the schema adapters;

the schema adapter processes the called function, when results of the function are requested, by obtaining the data from the data store;

the schema adapter requests the production of an instance of one of the object oriented classes, wherein an object oriented class encapsulates the data and associated behaviors needed to transfer and present the data obtained from the data store to the client application;

the schema adapter populates the produced instance of the object oriented class with the data obtained from the data store; and the populated instance of the object oriented class is forwarded to the client application through the instance of the selected one of the client adapters for usage by the client application;

wherein, at least two of the client adapters, schema adapter and object oriented classes are flexibly adaptable, thereby allowing the system to handle different asset types and additional client applications and thereby providing dynamic interfaces.

42. The system according to claim 41, wherein the asset manager server is connected to by:

the client application providing logon information to the asset manager server;

the client application contacting the asset manager server for a connection; and establishing the connection between the asset manager server and the client application.

43. The system according to claim 41, wherein the client adapters and the schema adapters are flexibly adaptable.

44. The system according to claim 41 wherein the client adapters and the object oriented classes are flexibly adaptable.

45. The system according to claim 41, wherein the schema adapters and the object oriented classes are flexibly adaptable.

46. The system according to claim 41, wherein the client adapters, the schema adapters and the object oriented classes are each flexibly adaptable.

* * * * *